United States Patent [19]

Gardner et al.

[11] Patent Number: 4,746,718
[45] Date of Patent: May 24, 1988

[54] NOVEL OLIGOMERIC DIAMINE HARDENERS AND THEIR USE FOR CURING EPOXY RESIN SYSTEMS

[75] Inventors: Hugh C. Gardner, Somerville; Linda A. Domeier, Flemington, both of N.J.

[73] Assignee: Amoco Corporation, Chicago, Ill.

[21] Appl. No.: 34,553

[22] Filed: Apr. 6, 1987

[51] Int. Cl.$^4$ ............................................. C08G 59/50
[52] U.S. Cl. .................................... 528/98; 525/471; 525/534; 528/125; 528/149; 528/150; 564/328; 564/430
[58] Field of Search ................ 528/125, 98, 149, 150; 525/471, 534; 564/328, 430

[56] References Cited

U.S. PATENT DOCUMENTS

| | | | |
|---|---|---|---|
| 3,920,768 | 11/1975 | Kwiatkowski | 528/98 X |
| 4,579,885 | 4/1986 | Domeier et al. | 528/98 X |
| 4,624,997 | 11/1986 | Robeson et al. | 525/471 |
| 4,645,803 | 2/1987 | Kohli et al. | 528/98 X |
| 4,665,150 | 5/1987 | Tesch et al. | 528/98 |

*Primary Examiner*—Earl Nielsen
*Attorney, Agent, or Firm*—Richard J. Schlott; William H. Magidson; Ralph C. Medhurst

[57] ABSTRACT

Diamines of the structure

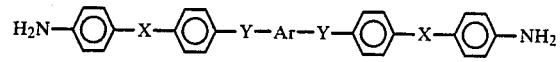

Wherein X is —SO$_2$— or —CO—, Y is O or S, and Ar is a linear aryl ether moiety comprising from 1 to 80 aryl rings, are epoxy resin curing agents providing cured resins with improved moisture resistance and toughness. The resins are particularly useful in preparing prepregs and composites.

15 Claims, No Drawings

NOVEL OLIGOMERIC DIAMINE HARDENERS AND THEIR USE FOR CURING EPOXY RESIN SYSTEMS

BACKGROUND OF THE INVENTION

This invention relates to epoxy resin systems for use in prepreg applications. More particularly, this invention relates to aromatic diamines useful as hardeners for epoxy resins and to resin systems comprising epoxy resins and particular diamine hardeners. The resin systems are useful in producing prepreg and advanced composites.

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured matrix resin. In order to be useful in commercial fabrication operations, prepreg matrix resin needs to have a long "out-time," defined as the period of time the prepreg can remain at room temperature and still be useful for making composites. Such prepreg is generally pliable and preferably has tack. Pliability is conferred by the matrix, which should remain soft and deformable without cracking in such applications. For epoxy-based prepreg systems comprising an epoxide resin and aromatic amine hardener, 4,4'-diaminodiphenylsulfone (DDS) has been the preferred hardener. DDS has a low level of reactivity with epoxy resins at room temperature and prepreg made using DDS-based systems has the desired long out-times.

Although cured composites prepared from DDS based matrix resins exhibit a useful combination of mechanical properties, the composites absorb moisture which detrimentally affects the high temperature properties and dimensional stability of fabricated parts. In addition, most DDS-cured formulations are brittle and the cured composites have poor impact resistance.

Thus, there is a need for epoxy resin hardeners that exhibit the low room temperature reactivity of DDS while providing epoxy-based composites having reduced moisture sensitivity and improved toughness.

BRIEF SUMMARY OF THE INVENTION

Oligomeric diamines having aminophenyl sulfone or ketone terminal groups are useful hardeners for epoxy resins. The resulting formulations exhibit desirably long out-times, and composites based on such formulations exhibit improved impact properties and good moisture resistance.

DETAILED DESCRIPTION OF THE INVENTION

The diamines of this invention may be represented by the following general formula:

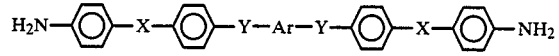

where X is —$SO_2$— or —CO—, Y is O or S, and the Ar portion of the aryl ether moiety Y—Ar—Y— comprises from 1 to 80 aryl rings. The aryl ether moiety Y—Ar—Y— may be further represented as being selected from the group consisting of:

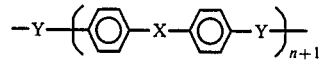

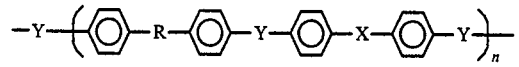

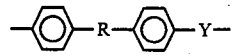

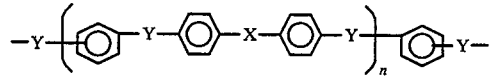

wherein
n=0 to 20;
R=—$CH_2$—, —$C(CH_3)_2$—, direct bond, O, or S;
Y=O or S;
X=—$SO_2$— or —CO—.

Specific diamines which may be useful as hardeners for epoxy resin formulations according to the practice of this invention include, for example, diamines such as:

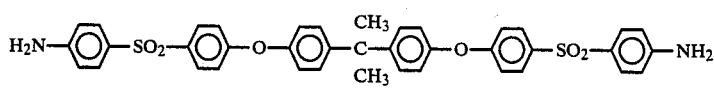

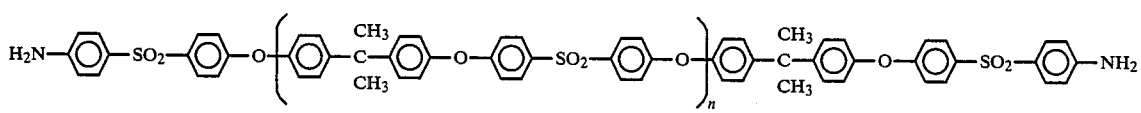

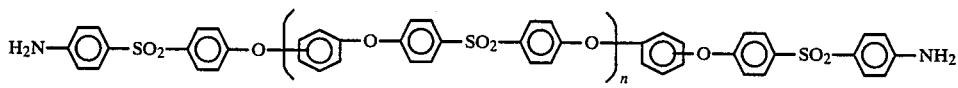

or mixtures thereof.

Oligomeric diamines of this invention may be prepared by condensing dihydric phenols or aromatic dithiols with the appropriate 4-chloro-4'-aminodiphenyl compound. For example, condensing 4-chloro-4'-aminodiphenyl sulfone and bisphenol A in the presence of a base in a dipolar aprotic solvent provides the compound having the structure:

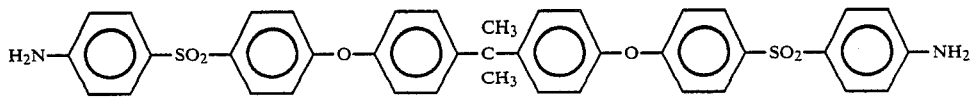

The resulting diamine product may also contain a limited amount of the corresponding mono-terminated product which will not in limited quantities affect its utility as a hardener.

Other diamine compounds of this invention which may be useful as epoxy hardeners may be prepared by a two-step process comprising:

(a) condensation of 4,4'-dichlorodiphenyl sulfone with a dihydric phenol or aromatic dithiol to form a chlorine-terminated oligomer, followed by (b) conversion of the terminal chlorine groups to amino groups by reaction with ammonia, using conditions such as those described by G. Spielberger in *Houben-Weyl, Nitrogen Compounds*—II (11/1) pages 24 et seq. Georg Thieme Verlag, Stuttgart, 1957.

Still another route to some oligomeric diamines within the scope of this invention consists of the reaction of 4-amino-4'-hydroxydiphenyl sulfone in its phenate form with aromatic dihalides such as dichlorodiphenyl sulfone, 2,6-dichlorobenzonitrile, 4,4'-difluorobenzophenone and the like. For example, the condensation process as disclosed in U.S. Pat. No. 3,895,064 and in British Pat. No. 1,492,366 may be used.

The oligomeric diamines of this invention may also comprise mixtures, and the synthetic methods used often produce such mixtures. Where 4-chloro-4'-aminodiphenyl sulfone and a diphenol are the only components the product is a single diamine. However, a reaction mixture comprising both 4,4'-dichlorophenyl sulfone and 4-amino-4'-chlorodiphenyl sulfone, together with the appropriate amount of dihydric phenol, will provide a mixture of oligomeric products, as will combinations of 4-amino-4'-hydroxy diphenyl sulfone, bisphenol and aromatic dihalide in various ratios. These mixed diamines will also be seen to be useful as epoxy resin hardeners. The average molecular weight of the oligomer diamine will affect the room temperature tack of the final epoxy formulation, and the higher molecular weight diamines may affect the heat distortion temperature of the cured matrix resin. For that reason, diamines having n=0–1 and average molecular weights in the range of from about 550 to about 1000 will be preferred when present as the only diamine hardener used. The higher molecular weight diamines will also have utility in such applications, particularly when combined with low molecular weight hardeners such as DDS or the like.

Synthesis of the 4-chloro-4'-aminodiphenyl sulfone component employed in the preparation of the oligomeric diamines of this invention can be accomplished by reaction of the sulfinate salt of 4-chlorobenzenesulfonyl chloride with 1-chloro-4-nitrobenzene. The resulting 4-chloro-4'-nitrodiphenyl sulfone is then reduced to the corresponding 4-chloro-4'-aminodiphenyl sulfone.

The diamines of this invention may be used as hardeners for epoxy resins where improved moisture resistance and toughness are needed. The epoxy resins which may be used for such formulations are those that contain at least two epoxy groups, and includes any of these commonly employed in the composite art, such as, for example, polyglycidyl compounds and epoxidized dienes or polyenes. Preferred epoxides include Bisphenol A epoxies, epoxy novolaks, and glycidyl amines such as PGA-X from Sherwin Williams Company, and Glyamine 125 from F.I.C. Corp., and MY-720 from Ciba-Geigy Corp.

The diamines may also be used in combination with any of the aromatic diamines conventionally used as hardeners in epoxy resin formulations. A preferred hardener blend is a 50/50 molar mixture of 4,4'diaminodiphenyl sulfone and a diamine of this invention. Other conventional diamines which may be useful in such a combination include, for example, m-phenylenediamine, 4,4'-methylene-dianiline, 2,2'-bis(4-aminophenoxy-4-phenyl)propane, trimethylene glycol di-p-aminobenzoate (from Polaroid Corporation), 4,4'-diaminodiphenyl ether, 3,4'-diaminodiphenyl ether, 3,3'-diaminodiphenyl sulfone, 3,3'-diaminobenzophenone, p-phenylene-diamine, 4,4'-diaminodiphenylpropane, 4,4'-diaminodiphenyl sulfide, 1,4-bis(m-aminophenoxy)benzene, 1,3-bis(m-aminophenoxy)benzene, and 1,3-bis(p-aminophenoxy)benzene. Still further examples include xylylene diamine and di(aminomethyl)-cyclohexane as well as the hardeners disclosed in U.S. Pat. No. 4,517,321, and polychlorinated derivatives of m-phenylenediamine, such as 1,3-diamino-2,5-dichlorobenzene.

The epoxy resin formulations may be prepared according to methods and practices well-known and understood in the resin art. Generally, the formulations will comprise from about 5 to 95 wt.% epoxy resin, and correspondingly from 95 to 5 wt.% of the diamine hardener component, depending upon the molecular weights of the individual components and the molar ratio of amine functionality to epoxy functionality desired in the final matrix resin system. For prepreg and composite formulations, the molar ratio of N-H groups in the hardener to epoxide groups in the epoxy resin which is commonly employed in the art lies in the range of from about 0.3/1 to 1.8/1; preferably from 0.4/1 to 1.3/1.

The epoxy formulations prepared using the diamines of this invention may further include a thermoplastic polymer. Such materials have beneficial effects on the viscosity and film strength characteristics of the epoxy/hardener mixture. Certain thermoplastics can also enhance impact resistance in cured compositions. Any of the variety of thermoplastics conventionally used in combination with epoxy resins for preparing composites, including polyaryl ethers such as polyaryl sulfones, polyether ketone, polyphenylene ether and the like, polyarylates, polyamides, polyamide-imides, polyetherimides, polycarbonates, phenoxy resins and functionalized butadiene/acrylonitrile copolymers may be included in these formulations.

The epoxy formulations may additionally contain an accelerator to increase the rate of cure. Any of the accelerators known and used in the epoxy resin art may be employed, including Lewis acid:amine complexes such as $BF_3$:monoethylamine, $BF_3$:piperidine, and $BF_3$:2-methylimidazole, amines as imidazole, 1-methylimidazole, and 2-methylimidazole; N,N-dimethylbenzylamine and the like; acid salts of tertiary amines, such as the p-toluenesulfonic acid:imidazole complex and the like, salts of trifluoromethane sulfonic acid, such as FC-520 (obtained from 3M Company), organophosphonium halides, dicyandiamide and 1,1-dimethyl-3-phenyl urea, as well as mixtures.

The epoxy formulations of this invention will be further combined with fiber reinforcement or structural fiber in the preparation of prepreg and composites. Fibers useful for these purposes include carbon, graphite, glass, silicon carbide, poly(benzothiazole), poly(benzimidazole), poly(benzoxazole), alumina, titania, boron, and aromatic polyamide fibers. These fibers may be generally characterized as having a tensile strength of greater than 100,000 psi, a tensile modulus of greater than two million psi, and a decomposition temperature of greater than 200° C. The fibers may be used in the form of continuous tows (500 to 400,000 filaments each), woven cloth, whiskers, chopped fiber or random mat. The preferred fibers are carbon fibers, aromatic polyamide fibers, such as Kevlar 49 fiber (obtained from E. I. DuPont de Nemours), and silicon carbide fibers.

The proportion of the various components of these formulations will depend in part upon the particular end-use envisioned. However, for most purposes, the formulations will comprise 100 parts by weight (pbw) of the combined diamine hardener and epoxy resin components, from 0 to 30 pbw of thermoplastic, and from 0 to 400 pbw fiber reinforcement.

For some applications, it may be desirable to include dyes, pigments, stabilizers, and the like, as well as particulate fillers such as, for example, talc, mica, calcium carbonate, aluminum trihydrate, glass microballoons, phenolic thermospheres, and carbon black. Thixotropic agents such as fumed silica may also be used. These and other additives will be included as needed and at levels commonly practiced in the composite art.

The fiber-reinforced compositions or prepreg may be prepared by any of several standard techniques known in the art, including wet winding or hot melt. Composites are generally prepared from such prepreg by curing the preimpregnated reinforcement using heat and pressure. Laminates may also be prepared via wet lay-up followed by compression molding, resin transfer molding or by resin injection. The epoxy resin formulations may also find use in filament winding.

When fiber-reinforced, the epoxy resin formulations may be used in forming aircraft parts such as wing skins, wing-to-body fairings, floor panels, flaps, radomes; in the manufacture of automotive parts such as driveshafts, bumpers, and springs; and in pressure vessels, tanks and pipes. They may also be suitable for use as protective armor on military vehicles and in sporting goods applications such as golf shafts, tennis rackets, and fishing rods. Compositions comprising epoxy resins and the diamines of this invention may also find use in coating, adhesive and sealant applications.

EXAMPLES

The following examples describe the preparation of oligomeric diamines of this invention and their use in the preparation of curable and cured resin compositions. The examples serve to give specific illustrations of the practice of this invention but they are not intended in any way to limit the scope of the invention.

EXAMPLE 1

PREPARATION OF 4-CHLORO-4'-AMINODIPHENYL SULFONE

A 5-liter round bottom flask equipped with a paddle stirrer, reflux condenser, nitrogen inlet and bubbler, thermometer, heating mantle, and Therm-O-Watch controller was charged with 3 liters of distilled water and 1500 g of sodium sulphite. This mixture was stirred and heated to 75° C. Over a period of 2 hours, the flask was charged with 600 g of 4-chlorobenzene sulfonyl chloride and 525 g of sodium carbonate. An eighth portion of each was added every 15 minutes, the additions of bicarbonate producing a foam. After the final addition, the reaction was stirred one more hour at 75° C. and then cooled to 40° C. and filtered to collect the solid crude sulfinate salt. The salt, after a single water wash, was charged to a second flask equipped as above, together with 3500 ml of N,N-dimethyl formamide and 448 of 1-chloro-4-nitrobenzene. The reaction mixture was stirred and heated at 130° C. for about 18 hours. During this time the reaction color changed from orange to black. After cooling, the mixture was poured into two volumes of water and the precipitated product, 4-chloro-4'-nitrodiphenyl sulfone, was collected by filtration and washed with ethanol.

The crude product was charged to a 12-liter round-bottom flask, equipped as above and containing 2125 ml methanol, 2125 ml concentrated hydrochloric acid, and 1190 g stannous chloride dihydrate. The mixture was stirred and heated at reflux for 5 hours, then cooled and treated while stirring continued with 1340 g of sodium hydroxide, resulting in a pH for the mixture of about 5. The solid products were collected by filtration, washed with water and with 10 percent aqueous sodium hydroxide, then extracted with ethanol in a Soxhlet apparatus. Cooling and concentrating the ethanol extracts produced a crystalline product which, when collected by filtration and dried, amounted to 375 g (50 percent yield on three steps) of crystalline solid with a melting point of about 180°-183° C. The NMR was consistent with the expected 4-chloro-4'-aminodiphenyl sulfone.

EXAMPLE 2

A one-liter round-bottom flask equipped with a paddle stirrer, reflux condenser and Dean-Stark trap, nitrogen inlet and gas bubbler, thermometer, heating mantle, and Therm-O-Watch temperature controller was charged with 63.95 g of bisphenol A, 200 ml of dimethyl sulfoxide, and 200 ml of toluene. This mixture was sparged with nitrogen for 30 minutes at 45° C. An addition funnel was used to add 44.67 g of an aqueous sodium hydroxide solution (49.9 percent NaOH, equivalent weight 80.10 g/hydroxyl) over a 15 minute period followed by an additional 15 ml water rinse. The mixture was then heated to reflux and water was azeotropically removed. After about 1.5 hours a white salt began to form on the sides of the flask. After 2.5 hr., toluene recycle was stopped, and 190 ml of toluene were distilled out over a 4 hr. period. A 149.85 g portion of the 4-chloro-4'-aminodiphenyl sulfone prepared in Example 1 was then added over about a 15 minute period and the mixture was then heated to 160° C. over 30 minutes and held for 2.5 hours. The mixture was cooled to room temperature, reheated to 85° C., and the pH was adjusted to pH 6 with oxalic acid. The hot mixture was filtered, then added to about 10 volumes of water in a rapidly stirring blender to precipitate the product, which was collected by filtration and washed five times with water. The product, dried at 50° C. in a vacuum oven, amounted to 170 g (88 percent) and had a melting point of about 121°–125° C. The NMR was consistent with the expected structure (shown below) plus a small amount of the monoterminated bisphenol A adduct.

then heated to reflux. Water was removed by distilling the toluene azeotrope. The disappearance of starting materials was followed by liquid chromatography. After about 21 hrs, the mixture was cooled, then reheated to 80° C. and filtered. After the pH was adjusted to about 6 by adding 3 g of oxalic acid, the filtrate was added to a 3-liter round-bottom flask fitted with reflux

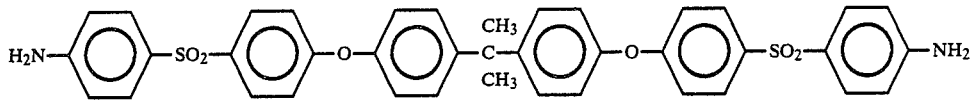

EXAMPLE 3

A 100 ml round-bottom flask equipped with a stirring bar, reflux condenser and Dean-Stark trap, nitrogen inlet and bubbler, thermometer, and heating mantle with temperature controller was charged with 7.71 g of 4-chloro-4'-aminodiphenyl sulfone, 1.43 g of resorcinol, 2.59 g of potassium carbonate, 20 ml of dimethylacetamide, and 20 ml of toluene. The mixture was sparged with nitrogen for 15 minutes and then heated to reflux. When the progress of the reaction (followed by liquid chromatography) slowed after two days, additional potassium carbonate (2.6 g) was added, and toluene was added as needed to maintain volume. After three days, the mixture was cooled to about 80° C. and filtered. After the pH was adjusted to about 6 with oxalic acid, the liquid filtrate was charged to a 1-liter flask containing 270 ml of methanol, stirred, and heated to reflux over a 1 hour period as 175 ml of water were added. Upon cooling to room temperature with continued stirring, the mixture became an opaque peach color, and addition of more water gave a white precipitate. As the solid product precipitated, it was collected by repeated filtration, washed three times with water and then dried to a solid having a m.p. of 150°–164° C. LC analysis of the product mixture (3.5 g) showed a mixture of four major products and no significant amount of starting materials. Titration of the product gave an amine ($NH_2$) equivalent weight of 328 grams per equivalent which corresponds to the compound having the following structure with n=0.25:

condenser and stirrer and containing 1100 g of methanol. The stirred solution was heated to reflux and 730 g of water were added over a 1 hr period. After cooling to room temperature, the gummy precipitate was collected, washed with hot water in a Waring blender, collected by filtration and dried. The NMR and IR were consistent with the intended oligomer diamine, shown below. The nitrogen content was 2.03 wt.%, corresponding to a diamine having the following structure with a molecular weight of 1380, or n=1.56:

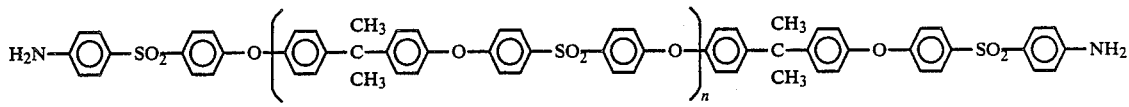

BLENDS OF OLIGOMERIC DIAMINE HARDENERS WITH EPOXIDES

EXAMPLE 5

A mixture of 22.1 g of a liquid bisphenol A epoxy resin with an epoxy-equivalent weight (EEW) of 189 g mole (Epon 828 from Shell Chemical Co.), 22.1 g of N,N-diglycidyl aniline (Glyamine 125 available from F.I.C. Corporation), 10.4 g of 4,4'-diaminodiphenyl sulfone, and 10.4 g of the diamine product of Example 2 were blended by stirring the two epoxies at 120° C. and then adding the two diamines. This mixture had an NH/epoxide molar ratio of 0.67. After the mixture was stirred for 10 minutes, a vacuum was applied for about 13 minutes; the mixture was not stirred during the last 3 minutes of this degassing step. Vacuum was broken, and the mixture was then cast into a small casting frame and held at room temperature. The uncured mixture, a clear, dark amber solution, retained tackiness for over four weeks indicating that the oligomeric diamine of this invention has low room temperature reactivity.

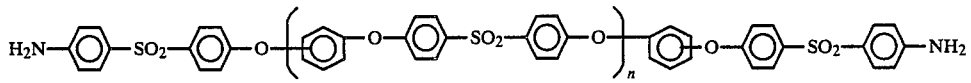

EXAMPLE 4

A 500 ml round-bottom flask, equipped with a stirrer, thermometer, nitrogen inlet and bubbler, reflux condenser, Dean-Stark trap, and heating mantle with temperature controller, was charged with 200 ml of dimethylacetamide, 85 ml of toluene, 50.0 g of 4-amino-4'-chlorophenyl sulfone (prepared as in Example 1), 26.814 g of 4,4'-dichlorodiphenyl sulfone, 42.636 g of Bisphenol A and 34.5 g of potassium carbonate. The mixture was stirred, sparged with nitrogen for 15 min., The casting was then cured by heating, using a heating schedule of about 100° C. for 18 hours, 140° C. for about 8 hours, and 175° C. for about 4 hours. A water soak test on pieces of the cured casting showed an average 1.9 percent weight gain (160° F. for two weeks). The heat distortion temperature of the cured material was 137° C. (ASTM D-648, 264psi stress).

EXAMPLE 6

The general procedure of Example 5 was repeated except that 17.2 g of Epon 828, 17.2 g of Glyamine 125, and 30.7 g of the diamine prepared in Example 2 were used. This mixture had an NH/epoxide molar ratio of 0.69. Cured material showed a weight gain in the water soak test of only 1.6 percent and a heat distortion temperature of 128° C., while the uncured material remained tacky after four weeks at room temperature.

Control A

Blend of Diaminodiphenyl Sulfone with Epoxides

The general procedure of Example 5 was repeated except that 24.6 g of Epon 828, 24.6 g of Glyamine 125, and 15.8 g of 4,4'-diaminodiphenyl sulfone were used. This mixture had an NH/epoxide molar ratio of 0.69. The cured material showed a weight gain of 2.0 percent in the water soak test. Thus, this composition absorbed more water than those in Examples 5 and 6.

EXAMPLE 7

The general procedure of Example 5 was repeated except that 17.9 g of N,N,N',N'-tetraglycidyl xylylene diamine (PGA-X available from Sherwin-Williams), 17.9 g of Glyamine 125, 14.6 g of 4,4'-diaminodiphenyl sulfone, and 14.6 g of the diamine prepared in Example 2 were used. This mixture had an NH/epoxide molar ratio of 0.86. The cured material showed a weight gain in the water soak test of 4.4 percent. The uncured material retained tackiness for two weeks at room temperature.

EXAMPLE 8

The general procedure of Example 5 was repeated except that 12.8 g of PGA-X, 12.8 g of Glyamine 125, and 39.5 g of a diamine identical to that made in Example 2 were used. This mixture had an NH/epoxide molar ratio of 0.86. The cured material showed a weight gain in the water soak test of 2.9 percent. The uncured material had no tack at room temperature, but was pliable, and remained pliable for three weeks at room temperature.

Control B

Blend of 4,4'-Diaminodiphenyl Sulfone with Epoxides

The general procedure of Example 5 was repeated except that 20.9 g of PGA-X, 20.9 g of Glyamine 125, and 23.2 g of 4,4'-diaminodiphenyl sulfone were used. This mixture had an NH/epoxide molar ratio of 0.86. The cured material showed a weight gain of 5.1 percent in the water soak test. Thus this composition absorbed more water than those in Examples 7 and 8.

EXAMPLE 9

A test tube was charged with 2.31 g of the oligomeric diamine prepared in Example 3, 0.40 g of bis(2,3-epoxycyclopentyl)ether and 1.21 g of N,N,N',N'-tetraglycidyl-4,4'-diaminodiphenyl methane. This mixture had a NH/epoxide molar ratio of 1.00. The test tube was placed in an oil bath preheated to 120° C. and the contents were stirred for 15 minutes to obtain a homogeneous solution. Then the tube was removed from the bath and allowed to stand at room temperature. The mixture was checked periodically to determine its consistency. On cooling to room temperature, it was a soft tacky semisolid, suitable for making tacky, drapable prepreg. After 23 days at room temperature, the consistency was essentially unchanged, demonstrating that the composition has the stability needed for use in making prepreg with a long out-time.

EXAMPLE 10

The general procedure of Example 5 was followed using 34 g of Epon 828 and 38 g of the oligomer diamine of Example 4. The casting was cured by heating at 200° C. for 7 hr., producing a clear, dark yellow material. The water soak test showed a 1.2% weight gain. The heat distortion temperature was 107° C.

It will be apparent from Example 10 that higher molecular weight oligomer diamines such as the diamine of Example 4 may produce a highly viscous epoxy resin mixture having reduced room temperature tack and affect the heat distortion temperature of the cured resin. Such diamines will therefore ordinarily be employed in combination with lower molecular weight conventional hardeners such as DDS or with less viscous epoxide resins to ensure better room temperature tack characteristics.

Control C

Prior Art Oligomer Diamine/Epoxy Blends

An oligomeric diamine having the general formula:

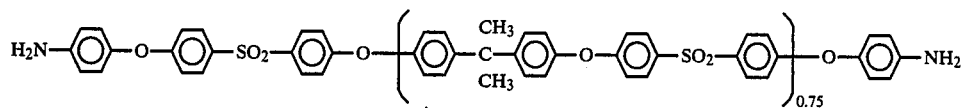

was prepared by a two-step process comprising: (1) heating a mixture of 205.4 g (0.90 moles) of bisphenol A and 603.1 g (2.10 moles) of 4,4'-dichlorodiphenyl sulfone in the presence of 435.4 g (3.1 moles) of powdered potassium carbonate in a N,N-dimethylacetamide/toluene mixture for 6 hrs. at 160° C. to form a chloride-terminated oligomer of the general formula:

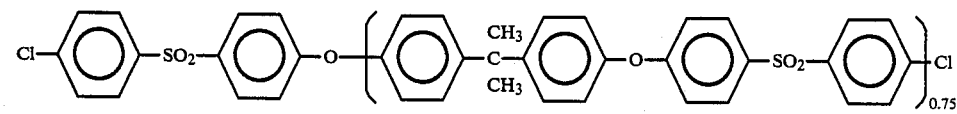

and (2) reacting the chloride terminated oligomer of (1) with 274.5 g (2.52 moles) of p-aminophenol in the presence of a base for 11 hours at 160° C. This oligomeric diamine differed from the diamine of this invention in that it contained an oxygen linkage para to the terminal $NH_2$ groups.

The oligomeric diamine prepared above had a titrated weight per —NH₂ of 411 g/equivalent and melted at a temperature of 123°–128° C.

An oligomeric diamine mixture having a titrated weight per —NH₂ of 328 g/equivalent was prepared by blending 5.25 g of the above diamine (weight per—NH₂=411) with 0.96 g of 4,4′-bis(4-aminophenoxy)-diphenyl sulfone, which had a weight per—NH₂ of 216 g/equivalent. A thermosetting resin composition was prepared by combining 3.46 g of this oligomeric diamine mixture (overall weight per —NH₂=328 g/equivalent) with 0.60 g of bis(2,3-epoxycyclopentyl)ether and 1.82 g of N,N,N′N′,-tetraglycidyl 4,4′-diaminodiphenyl methane (i.e. MY-720 from Ciba Geigy Corp.). This composition had the same NH/epoxide molar ratio and same weight ratio of epoxides as in Example 9.

A homogeneous solution was obtained by stirring and heating the reactants in a test tube in an oil bath at a temperature of 120° C. for 15 minutes. The tube was removed from the bath and allowed to stand at room temperature. After 1 hour, the resin was a hard, non-tacky, brittle solid. Thus, this material was unsuitable for use as a prepreg resin due to the extremely short room temperature out-time.

Prior art diamines with an oxygen linkage on the same ring as the terminal NH₂ group are described in U.S. Pat. Nos. 3,895,064 and 4,608,404. As demonstrated by Example 9 in comparison with the Control C example, the diamines of this invention have a reduced reactivity that results in longer out-times for prepreg formulations prepared using these diamines. The diamines of this invention also impart reduced water sensitivity and increased toughness to epoxy formulations when compared with formulations that use only the conventional diamine 4,4′-diaminodiphenyl sulfone as the hardener, as will be recognized by consideration of the properties shown in Control A and Control B examples in comparison with those of the formulations of the equivalent examples.

Although the invention has been illustrated by the preceding examples, various modifications such as the use of oligomer diamines having one or more inert ring substituents, and further embodiments including curable filled compositions and thermoset molding resins based on the resin compositions disclosed are possible, and these may be made without departing from the spirit and scope thereof as will be recognized by those skilled in the art.

We claim:

1. A diamine having the structure:

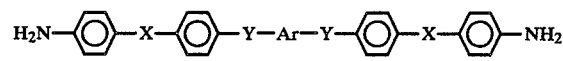

wherein X is —SO₂— or —CO—, Y is O or S, and Ar comprises from 1 to about 80 interconnected aryl radicals.

2. The diamine of claim 1 wherein the aryl ether moiety —Y—Ar—Y— is selected from the group consisting of

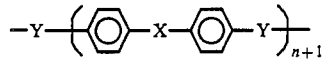

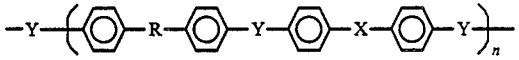

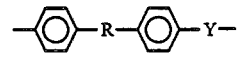

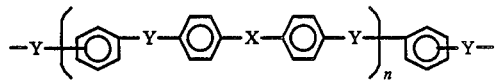

and mixtures thereof, and wherein X=—SO₂— or —CO—; Y=O or S; R=a direct bond, O, S, —CH₂— or —C(CH₃)₂—; and n=0–20.

3. The diamine of claim 1 wherein the aryl ether —Y—Ar—Y— moiety is

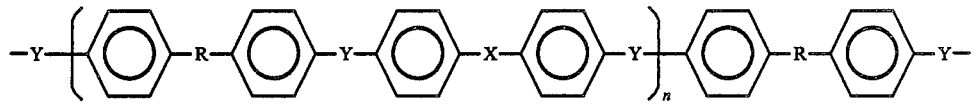

wherein n=0 to 20.

4. The diamine of claim 3, wherein n=0, R=—C(CH₃)₂—, X=—SO₂— and Y=O.

5. A mixture comprising a plurality of the diamines of claim 2.

6. The mixture of claim 5 wherein X is —SO₂—, Y is O, and R is —C(CH₃)₂.

7. The mixture of claim 6 wherein the mole ratio of the diamines present provides an average value for n of from 0 to about 2.

8. The mixture of claim 6, further comprising a diaminodiphenyl sulfone.

9. The mixture of claim 6, further comprising 50 mole% of a diaminodiphenyl sulfone.

10. In a resin formulation comprising 100 parts by weight of a curable mixture of epoxy resin and diamine hardener having an amine group/epoxy group molar ratio of from about 0.3/1 to about 1.8/1, from 0 to about 30 parts by weight of a thermoplastic and from 0 to about 400 pbw of fiber reinforcement, the improvement wherein the diamine hardener comprises at least one oligomer diamine having the structure:

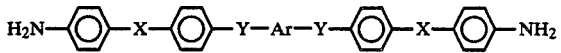

wherein X is —SO₂— or —CO—, Y is 0 or 5, and Ar comprises from 1 to 80 interconnected aryl radicals.

11. The improved composition of claim 10 wherein the aryl ether moiety —Y—Ar—Y— is selected from the group consisting of:

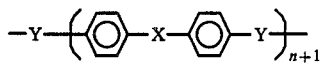

-continued

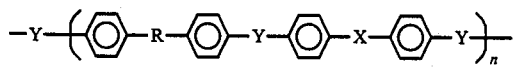

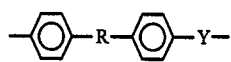

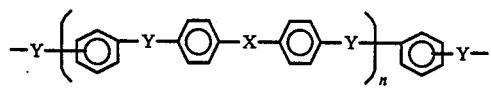

wherein X is —SO$_2$— or —CO—, Y is O or S, R is a direct bond, O, S, —CH$_2$— or —C(CH$_3$)$_2$— and n=0–20.

12. The improved resin formulation of claim 11 wherein X is —SO$_2$—, Y is O, and R is —C(CH$_3$)$_2$—.

13. The improved resin formulation of claim 12 wherein n=0–2.

14. The improved resin formulation of claim 10 further comprising a diaminodiphenyl sulfone.

15. The improved composition of claim 10 wherein the diamine hardener comprises from 0 to about 50 mole % of a diaminodiphenyl sulfone and correspondingly from about 50 to about 100 mole % of said oligomer diamine.

* * * * *